March 22, 1949.

H. L. COOKE 2,464,794

PROJECTION APPARATUS AND METHOD FOR
PREPARING THREE DIMENSIONAL MODELS

Filed Dec. 14, 1945

INVENTOR
H. L. COOKE
BY
Moses, Nolte, Crews & Berry
ATTORNEYS

Patented Mar. 22, 1949

2,464,794

UNITED STATES PATENT OFFICE

2,464,794

PROJECTION APPARATUS AND METHOD FOR PREPARING THREE-DIMENSIONAL MODELS

Hereward Lester Cooke, Princeton, N. J., assignor, by mesne assignments, to H. Lester Cooke, Jr., Priscilla Cooke Stewart, and Russell Prickett, as trustees Application December 14, 1945, Serial No. 635,030

9 Claims. (Cl. 88—24)

The object of this invention is to provide apparatus and a method whereby three dimensional models of terrain in relief may be readily prepared from planimetric maps showing contour lines of the earth's surface.

Relief models, heretofore, have been prepared by building the model in laminations each cut out along a contour line as shown on a flat, planimetric map of the terrain and superimposed on the cut out of the next lower contour line. This procedure is time consuming and is also objectionable because of the difficulty of cutting the exact outline of each contour line and the use and destruction of a map for each lamination; the step-like structure thereby produced must, moreover, be filled in with a suitable plastic material to simulate, even approximately, the true contour of the terrain.

By the method of my United States Patent No. 1,980,981, relief models can be prepared also from two aerial photographs taken from divergent points of view so as to provide, when combined and projected stereoscopically, a visual image of the terrain on a block of carvable material which is then carved or molded so as to reproduce the configuration of the terrain.

This invention constitutes an improvement upon the prior processes and apparatus in that it contemplates the production of two divergent and stereoscopically related tracings, e. g., on ground glass plates, of the contour lines of a flat map, each line being viewed and drawn on each tracing from an elevation above a datum plane corresponding to its actual elevation in nature— say above sea level. Using bi-colored stereoscopic projection of the two sets of tracings back upon a block of carvable material occupying the region of the stereoscopic image, this image can be then reproduced by carving of the block.

Obviously the two tracings of the two diverse but stereoscopically related images of each contour line can be effected more conveniently by two operators, one for each set of tracings. It is possible, however, for one operator to shift his position from one to the other view point to record at each elevation the image of a contour line on the respective ground glass plates.

In the accompanying drawings which form part of this specification.

Figure 1:
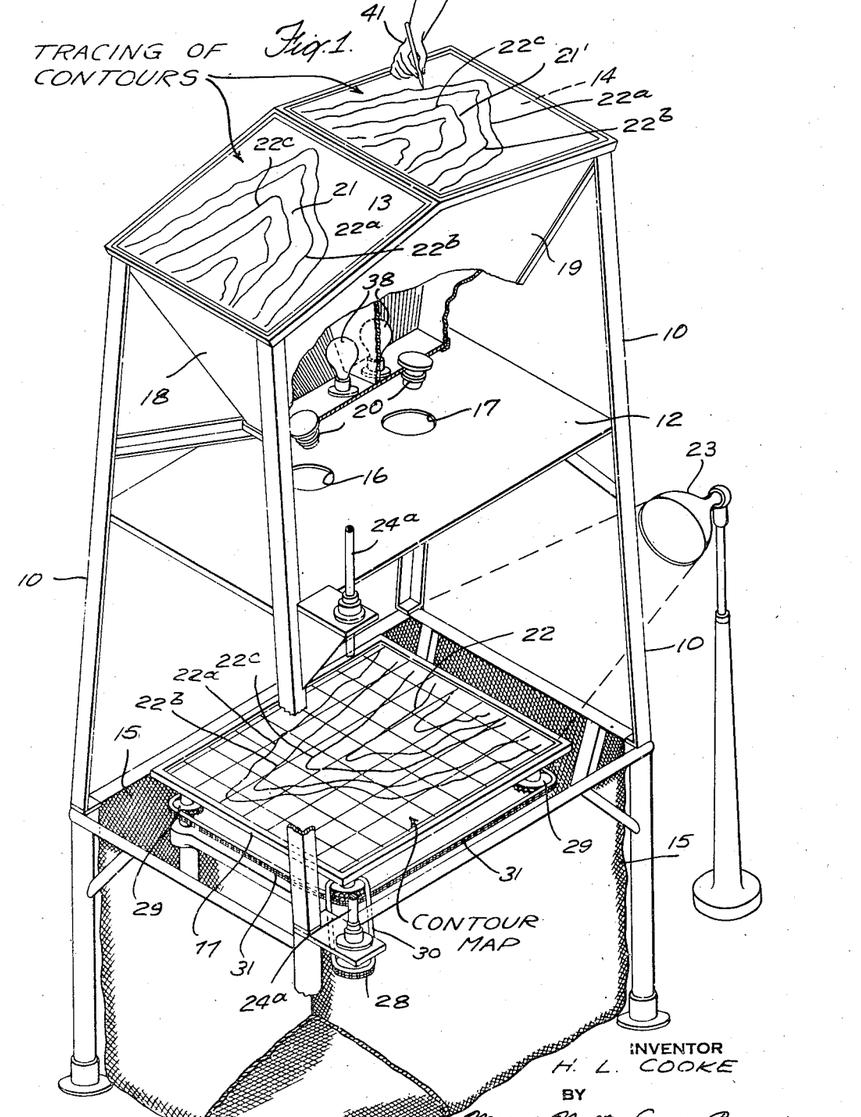
Fig. 1 is a diagrammatic view in perspective of one form of an apparatus which may be used in carrying out the invention, with portions of the view broken away better to show details of internal construction of the device and of the contour map.

The appearance of the device at the start of the operation is illustrated in Figure 1, where 10 designates the four vertical uprights of a frame; it is divided into three sections, primarily, by the horizontal frame and appurtenances of the raising table 11 and by the partition 12 which may be approximately midway between table 11 and the ground glass transparencies 13 and 14 which constitute the top of the device. A bag 15 may be provided beneath table 11, suspended from its supporting frame, for the purpose of collecting particles of material carved out of the relief model in the final stage of the operation.

Figure 2:
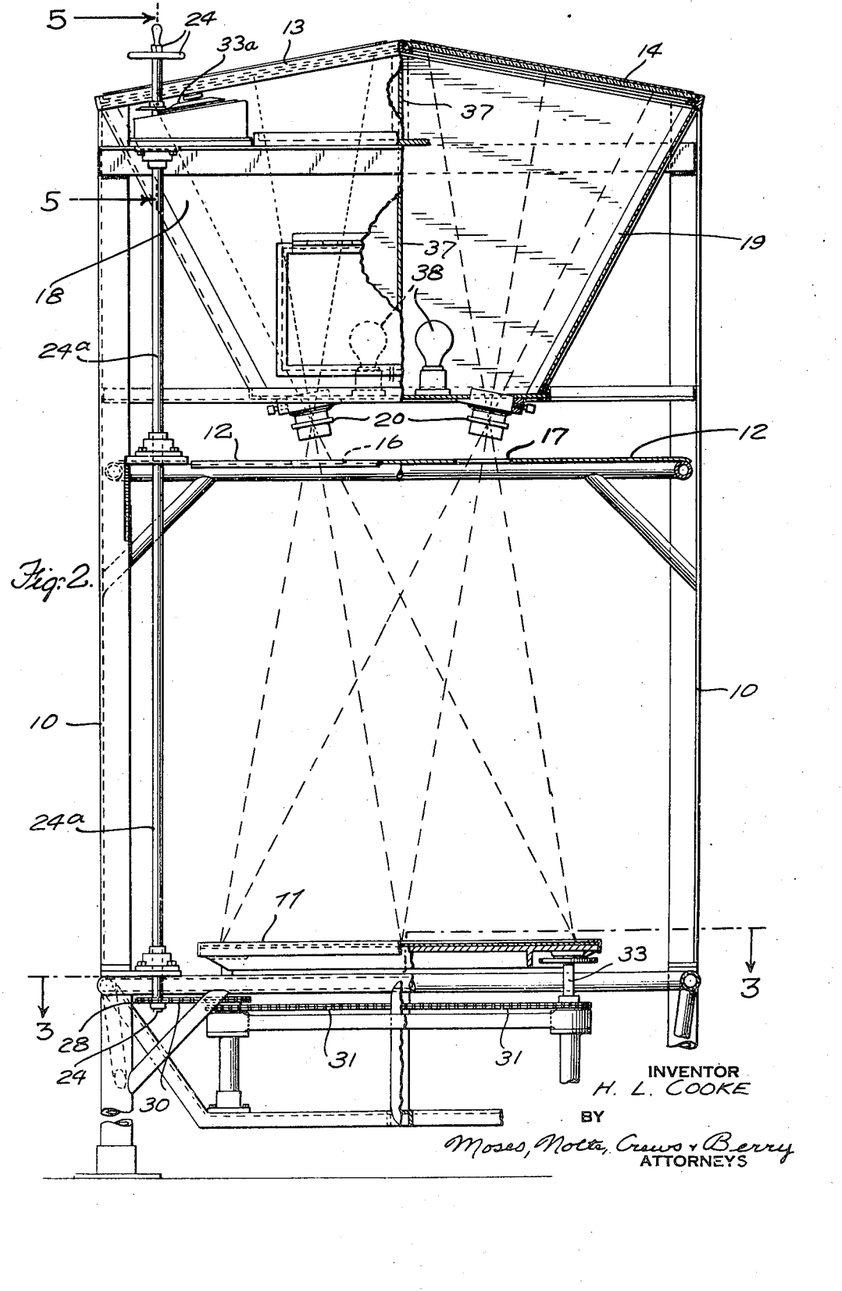
Fig. 2 is a front view of the apparatus showing the relative positions of the projector lenses and of their ground glasses with respect to the contour map and its supporting table, when they are in one position, say the datum plane, of their respective elevations.
Figure 3:
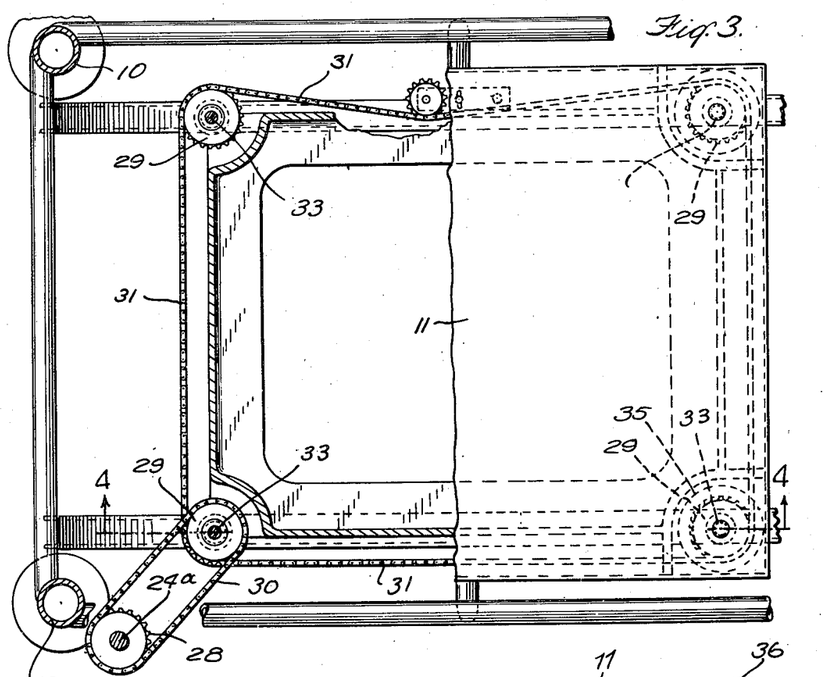
Fig. 3 is a plan view of the supporting table and the elevating gear therefor, with a portion of the view obscured by superimposition upon the table of a part of the board carrying the contour map.
Figure 4:
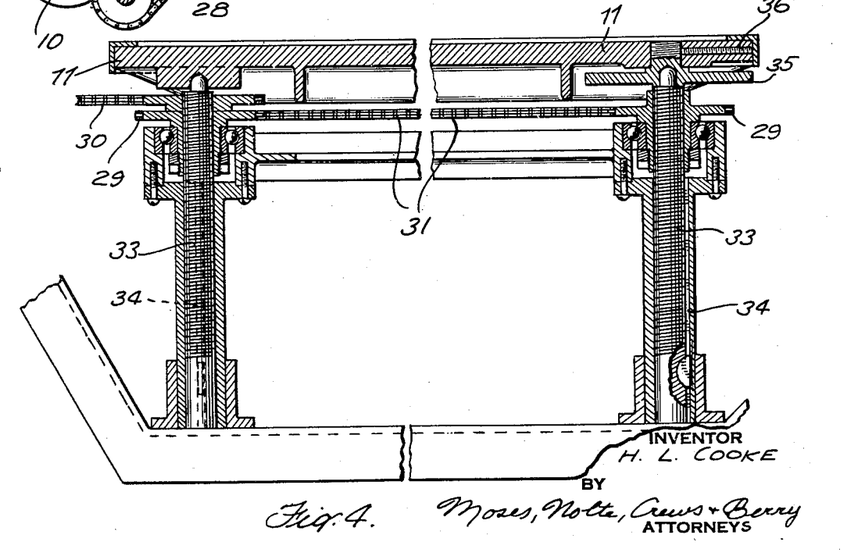
Figure 4 is a vertical sectional view taken on the line 4—4 of Figure 3, looking in the direction of the arrows and showing the construction of the mechanism for elevating the table carrying the contour map, the drawing being on a larger scale than that of Fig. 3, and with the intermediate portion broken away for compactness of illustration.

Apertures 16 and 17 are provided in partition 12 to permit passage therethrough of light rays as illustrated in Fig. 2. Two projection bellows or camera-like boxes 18 and 19 are angularly disposed in the upper section of the frame, each with a lens 20 and a focusing ground glass (13 and 14) so positioned as to project on each glass an image (21 and 21') of the contour lines of a contour map 22 placed upon table 11 (Fig. 1). Map 22 may be brightly illuminated, as by electric light bulbs in suitable reflectors 23 throwing a strong light upon map 22.

Figure 5:
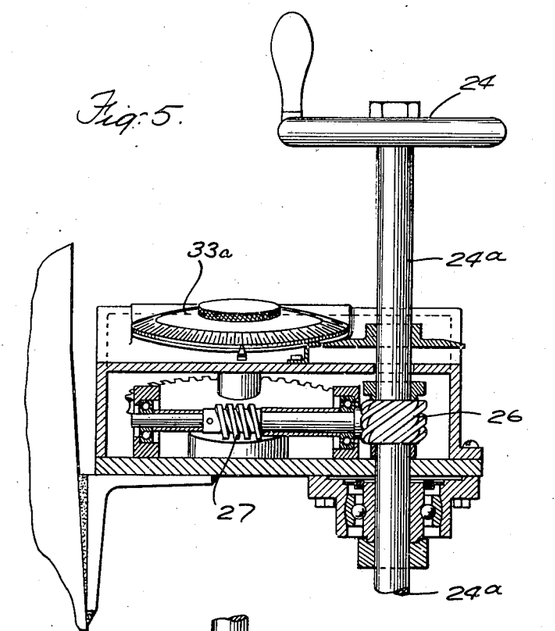
Figure 5 is an enlarged detail view in vertical section on line 5—5 of Fig. 2, of the vernier arrangement for measuring the precise elevation of the contour map, showing the mechanism whereby the vernier is actuated.
Figure 6:
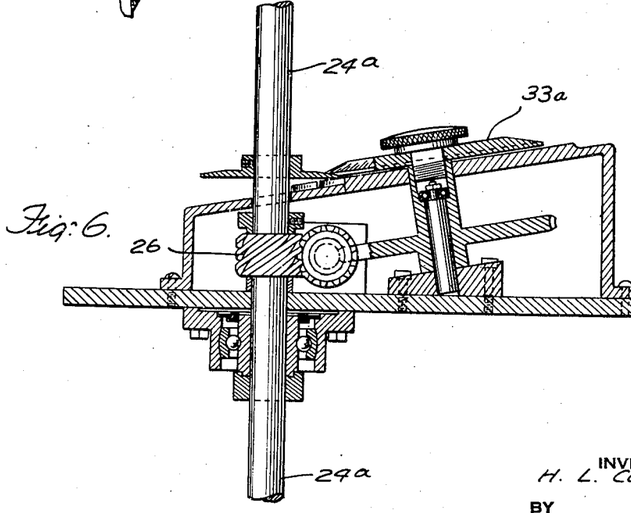
Figure 6 is a vertical sectional view taken at right angles to Fig. 5, also showing the vernier measuring apparatus.
Figure 7:
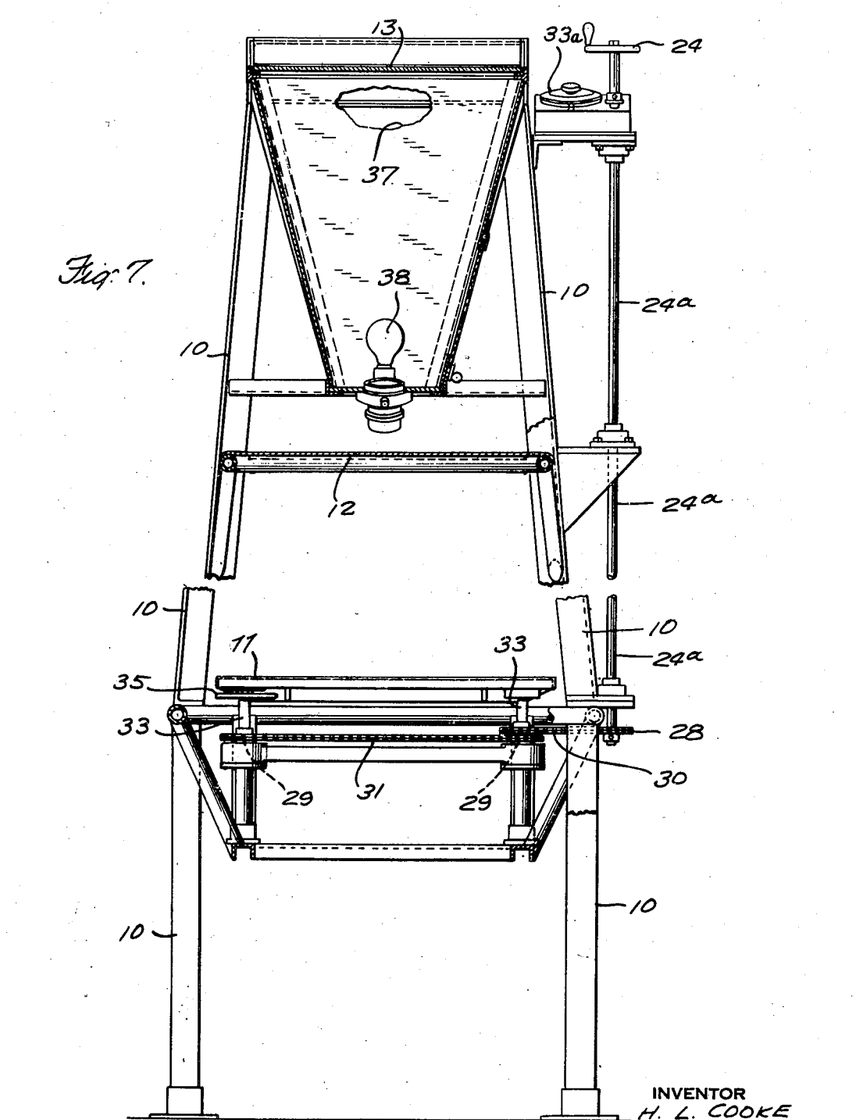
Figure 7 is a side elevation of the entire device of Figs. 1 and 2, with a portion broken away to show the outer edge of the translucent top of the device, and another portion broken away intermediate the frame for compactness of illustration.

Figs. 1, 2, 3, 4 and 7 illustrate in detail a mechanism designed to raise or depress table 11 and map 22 to the various heights with respect to the datum, plane which will correspond, at the scale selected, to the respective vertical elevations of the contour lines of the map. The vertical scale may be selected at will by changing the increments of vertical movement of map 22 between the depiction on 21 and 21' of the successive contour lines of the map. This mechanism comprises a hand wheel 24 on shaft 24a which by means of spiral gearing 26 and 27 revolves a vernier 33a (Figs. 5 and 6) by which the vertical elevation of the contour map can be determined with precision. Mounted at the lower end of shaft 24a is a sprocket wheel 28 (Figs. 1, 3 and 7) which revolves sprockets 29 by means of endless chains 30 and 31.

Sprockets 29 are mounted on ball bearings and are threaded internally. They revolve around shafts 33 which have a keyway engaging a key 34 which prevents revolution of the shaft 33 with the sprocket. The upper sections of shafts 33 are also threaded. Consequently revolution of the sprocket causes upward or downward movement of shafts 33 depending upon the direction of revolution of the sprockets. By this means the table 11 and map 22 can be elevated or depressed by the train of mechanism operated by the hand wheel 24, and to a degree corresponding at the selected scale to the respective distances between the contour lines of the contour map. Adjusting wheels 35 with threaded axles may be provided at three corners of the table, in order to level it when necessary; and when the table is set in exact horizontal plane the adjusting wheels may be fastened in position by means of the set screws 36.

Figures 8, 9:
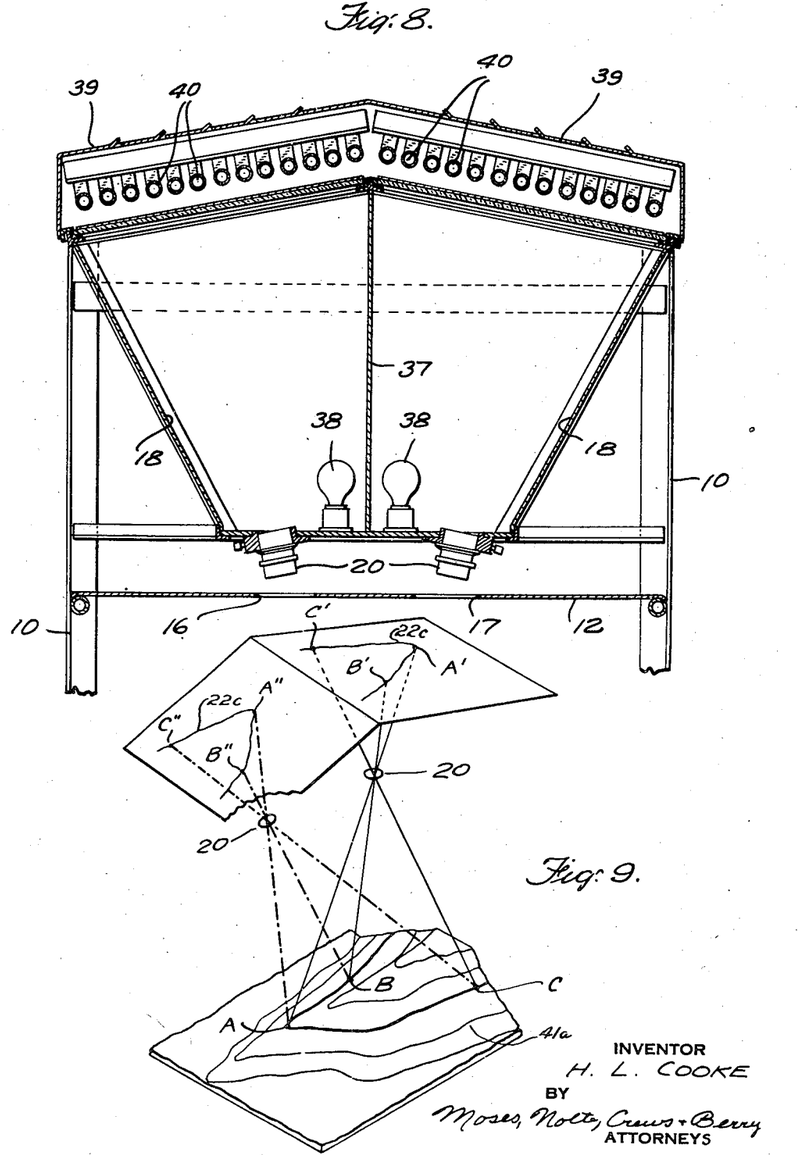
Figure 8 is a vertical sectional view of the upper portion of the device showing the illuminating unit mounted thereon for illumination of the translucent tracing plates of the device at certain periods of its use.
Figure 9 is a diagrammatic illustration of the paths of the light rays projected from the two tracings of contour lines during the period of illumination thereof, and the convergence or divergence of those light rays at certain positions of elevation of the relief model.
Figure 10:
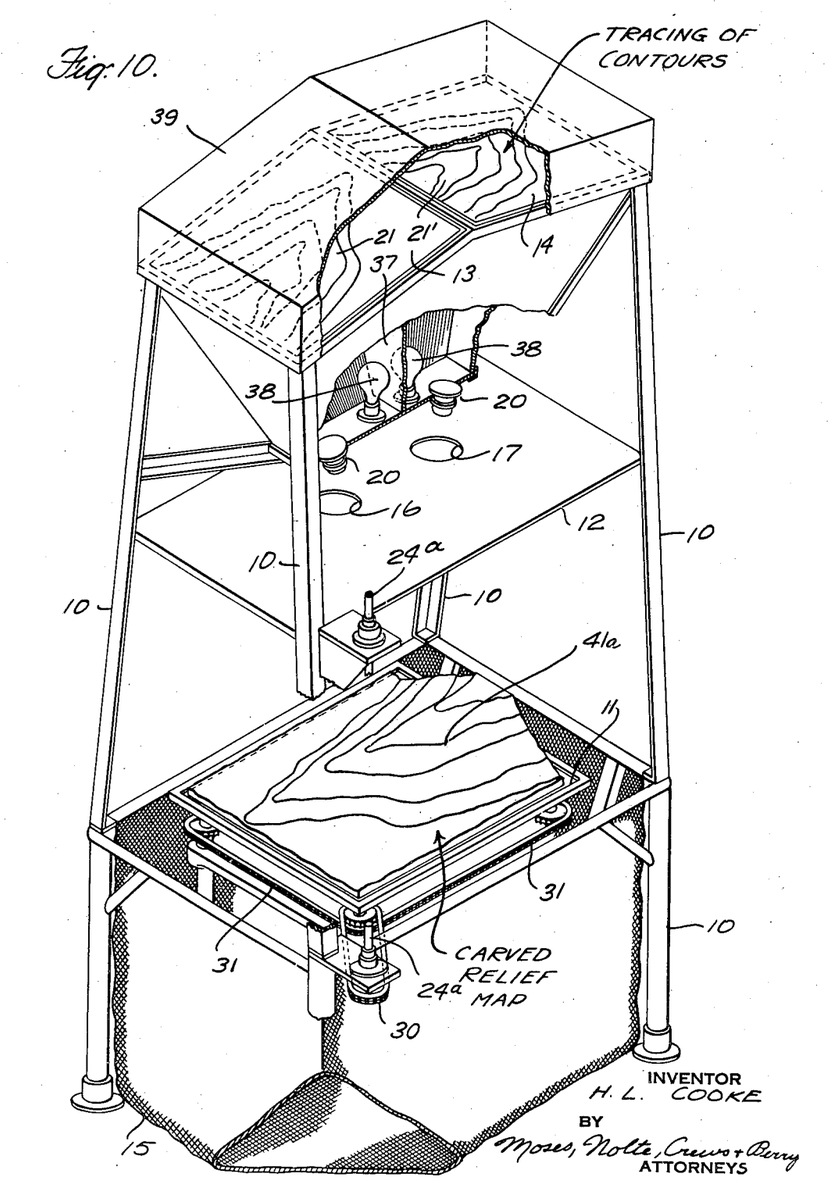
Figure 10 is a perspective view of the apparatus during the period when the tracings of contours are being projected, by their illuminations, upon the relief map during the carving of the map, with certain portions of the view broken away for clarity of illustration.

The cameralike boxes 18 and 19 are separated by a dividing partition 37 and near each side of this partition incandescent lamp bulbs are installed to provide temporary illumination of the translucent ground glasses 13 and 14 when needed separately, if desired, during the sketching of the contour lines on the ground glass. A separate lid-like structure or illuminating unit 39 provided with fluorescent tubes 40, or other extended source of light is provided for the illumination of the contour tracings after they have been completed, as seen in Figs. 8 and 10. This illuminating unit is of course used only after completion of the tracing of contours by hand as illustrated at 41 at the top of Fig. 1 of the drawings.

The operation of the device is as follows: The two operators are seated upon high stools or other means whereby they can look down upon the ground glasses 13 and 14 to reproduce the contour lines thereon. The operations are in comparative darkness; the apparatus is to be used in a darkened room, the only illumination at this stage of the operation being that provided by the lamps in the reflectors 23 which allow no light rays, except those reflected from the contour map, from diffusing upwardly towards the operators. The flat map 22 showing the contour lines is placed on the table at or near its lowest position of travel, and this position will be considered to be the datum plane of the relief map to be constructed.

With the map in this position and illuminated by reflectors 23, the operators sketch on ground glasses 13 and 14 the outermost and lowest contour line at 22a of the contour map. If, during sketching, they cannot see clearly at what point on the contour line they have arrived at that instant, one or the other of the incandescent bulbs 38 is momentarily lighted to illuminate and show distinctly the condition of the ground glass to the respective operator.

Having completed the two tracings of outer and lower contour line 22a, the table is then elevated by revolution of the hand wheel a sufficient distance, which may be a fraction of an inch, to represent the vertical difference in height at the selected scale of the terrain between the first and second lines. The operators then sketch the second contour line 22b, as before, and then raise the table and the contour map a second time corresponding to the interval between the second and third contour lines. They thereupon sketch contour line 22c, etc.

Proceeding thus they sketch each contour line at its proper elevation above the datum plane, producing thereby a set of two tracings of contours such as the two illustrated at the top of Fig. 1; these are stereoscopically related images of the lines of the contour map when seen each at the proper elevation. Having completed these tracings of contours the operators then place above the tracings the illuminating unit 39 of the device. They may, optionally, also place one or preferably two colored light filter screens on the lenses 20, for example a blue and red filter, so as to project images, in two colors, of the two contour tracings 21 and 21' on transparencies 13 and 14, upon a block of plaster of Paris or other suitable material.

The result of this procedure is illustrated by Fig. 9 which shows how light rays projected from one contour line of both stereoscopic views, e. g. #22c, approach one another and finally merge at a point in the interior of the plaster block 41a—before it is carved—corresponding to the elevation of that contour line, and that these rays then diverge beyond that point. With bi-colored illumination a different color effect is produced at all points upon lines where the rays cross.

To illustrate the effect in black and white, illumination, which may also be employed, a beam in Fig. 9 from one portion of contour line 22c, designated by A'B'C' and A"B"C" on the two tracings 21 and 21', is projected in broken and full lines onto a block 41a from which the relief model has been carved. The two beams converge between the tracings and the model until they cross and merge at all points along line ABC, which is shown unbroken because it represents the conjunction of two different rays to make a completed full image of the line. At all points beyond line ABC, it will be noted that the two beams diverge, so that sharp fused lines appear only along a model properly carved to represent the respective elevations of each line.

41a in Fig. 10 represents the block after it has been carved in the manner hereinafter described. During this portion of the operation the table 11 should be at a position which will place the lower side of the block in or below the datum plane, and the upper side of the block above a plane corresponding to the elevation of the fused image of the highest contour line. With the block in this position, the projections of the contour tracings will produce on the upper surface of the block a series of non-coinciding lines which are projected images of the transparent contour tracings; that is, each contour line with bi-colored illumination will be represented by a blue and red line which do not coincide.

These differently colored lines can coincide only after the block is carved sufficiently deeply at any point to expose a surface at a level corresponding to the elevation of that contour line on the map at the time when it was sketched upon the ground glass. The operators therefore proceed to chisel or carve away the block of plaster until there is coincidence of all points of the bi-colored contour lines; whereupon there will have been produced a relief map correctly representing the topographical configuration of the earth's terrain in the portion represented by the map.

Portions of the plaster or other suitable material which are thus cut away are caught by the bag 15 beneath the relief map. In this final stage the operators, of course, may be seated on low stools or chairs at any appropriate height above the floor so that they can look onto the plaster block nearly vertically, or at any appropriate angle at which coincidence of the bi-colored lines becomes apparent after sufficient carving of the block.

Having thus illustrated and described the details of the preferred procedure and apparatus which may be used in the practice of my invention, it will nevertheless be understood that I do not wish to limit myself to such details and claim as my invention any manner in which its principles may be usefully applied.

I claim:

1. The method of making relief models of terrain from flat contour line maps, which comprises elevating the map successively to different levels above a datum plane corresponding to the respective elevation of the contour lines of the map, projecting a visual image of each contour line at its proper level upon a pair of transparencies so arranged as to give divergent, stereoscopically related views of the line at that level, tracing on the transparencies images of the contour lines as thus projected, illuminating the two transparencies and projecting their visual images upon a block of modeling material, and forming the block until visual coincidence of the images of the lines is attained.

2. The method of making relief models of terrain from flat contour line maps, which comprises elevating the map successively to different levels above a datum plane corresponding to the respective elevation of the contour lines of the map, projecting a visual image of each contour line at its proper level upon a pair of transparencies so arranged as to give divergent, stereoscopically related views of the line at that level, tracing on the transparencies images of the contour lines as thus projected, illuminating the two transparencies each with a different color and projecting their bi-colored visual images upon a block of modeling material, and forming the block until visual coincidence of the bi-colored images of the lines is attained.

3. In combination in an apparatus for preparing a relief model of terrain from a flat contour line map, a supporting table for the map, a pair of projection lenses, means for supporting the projection lenses with their projection axes inclined to one another and passing through the plane of the table, means for mounting the projection lenses and table so that the distance between the lenses and table may be varied in a direction at right angles to the plane of the table, a pair of transparencies of such character that contour lines may be traced thereon and means for mounting the same in planes normal to the projection axes of the respective projection lenses and on the opposite side of said lenses from said table so that each of said projection lenses will project an image of said map upon the transparency associated with such lens.

4. In combination in an apparatus for preparing relief model of terrain from a flat contour line map, a supporting table for the map, a pair of projection lenses, means for supporting the projection lenses with their projection axes inclined in opposite directions to and passing through the plane of the table, means for mounting the projection lenses and table so that the distance between the lenses and table may be varied in a direction at right angles to the plane of the table, a pair of transparencies of such character that contour lines may be traced thereon and means for mounting the same in planes normal to the projection axes of the respective projection lenses and on the opposite side of said lenses from said table so that each of said projection lenses will project an image of said map upon the transparency associated therewith, and an illuminating unit to project the recorded sets of contour line images from the transparencies upon a block of modelling material when positioned upon said table.

5. In combination in an apparatus for preparing relief model of terrain from a flat contour line map, a supporting table for the map, a pair of projection lenses, means for supporting the projection lenses with their projection axes inclined in opposite directions to and passing through the plane of the table, means for mounting the projection lenses and table so that the distance between the lenses and table may be varied in a direction at right angles to the plane of the table, a pair of transparencies of such character that contour lines may be traced thereon and means for mounting the same in planes normal to the projection axes of the respective projection lenses and on the opposite side of said lenses from said table so that each of said projection lenses will project an image of said map upon the transparency associated therewith, an illuminating unit to project the recorded sets of contour line images from the transparencies upon a block of modelling material when positioned upon said table, and means to impart a different color to the two images projected upon said block from each of said recorded lines.

6. In combination in an apparatus for preparing a relief model of terrain from a flat contour line map, a frame, a table movably positioned in said frame to support the map, a pair of projection lenses mounted in said frame having their projection axes inclined to the plane of said table at diverse angles, a pair of transparencies of such character that contour lines may be traced thereon mounted in said frame at the opposite side of said lenses from said table and so arranged that stereoscopically related images of the map are projected upon the respective transparencies by the respective projection lenses, and means to move said table and map along an axis normal to the plane of the table towards and from said projection lenses to positions in space corresponding to the respective elevations indicated by the contour lines on the map.

7. In combination in an apparatus for preparing a relief model of terrain from a flat contour line map, a frame, a table movably positioned in said frame to support the map, a pair of projection lenses mounted in said frame having their projection axes inclined to the plane of said table at equal but opposite angles, a pair of transparencies of such character that contour lines may be traced thereon mounted in said frame at the opposite side of said lenses from said table and so arranged that stereoscopically related images of the map are projected upon the respective transparencies by the respective projection lenses, means to move said table and map along an axis normal to the plane of the table towards and from said projection lenses to positions in space corresponding to the respective elevations indicated by the contour lines on the map, and illuminating means to project recorded sets of contour line images from the transparencies upon a block of modelling material when positioned upon said table.

8. In combination in an apparatus for preparing relief model of terrain from a flat contour line map, an upright frame, a horizontal table mounted in the lower part thereof, micrometer means for adjusting the elevation of said table, a pair of chambers mounted in said frame above said table, each of said chambers having a projection lens mounted in the lower wall thereof, the axes of said projection lenses being inclined to the plane of the table at diverse angles, each of said chambers having at the top thereof a wall of transparent material capable of having a tracing made thereon, the top walls of the respective chambers each being normal to the projection axis of the lens mounted in the lower wall of said chamber.

9. In combination in an apparatus for preparing a relief model of terrain from a flat contour line map, an upright frame, a horizontal table mounted in the lower part thereof, micrometer means for adjusting the elevation of said table, a pair of chambers mounted in said frame above said table, each of said chambers having a projection lens mounted in the lower wall thereof, the axes of said projection lenses being inclined to the plane of the table at diverse angles, each of said chambers having at the top thereof a wall of transparent material capable of having a tracing made thereon, the top walls of the respective chambers each being normal to the projection axis of the lens mounted in the lower wall of said chamber, and means to momentarily illuminate the transparent walls when desired during the recording.

HEREWARD LESTER COOKE.

REFERENCES CITED

The following references are of record in the file of this patent:

UNITED STATES PATENTS

| Number | Name | Date |
| --- | --- | --- |
| 891,013 | Smith | June 16, 1908 |
| 1,596,458 | Schiesari | Aug. 17, 1926 |
| 1,910,425 | Cahill | May 23, 1933 |
| 1,980,981 | Cooke | Nov. 20, 1934 |
| 2,163,124 | Jeffereys et al. | June 20, 1939 |
| 2,374,981 | Cooke | May 1, 1945 |